United States Patent Office 2,731,034
Patented Jan. 17, 1956

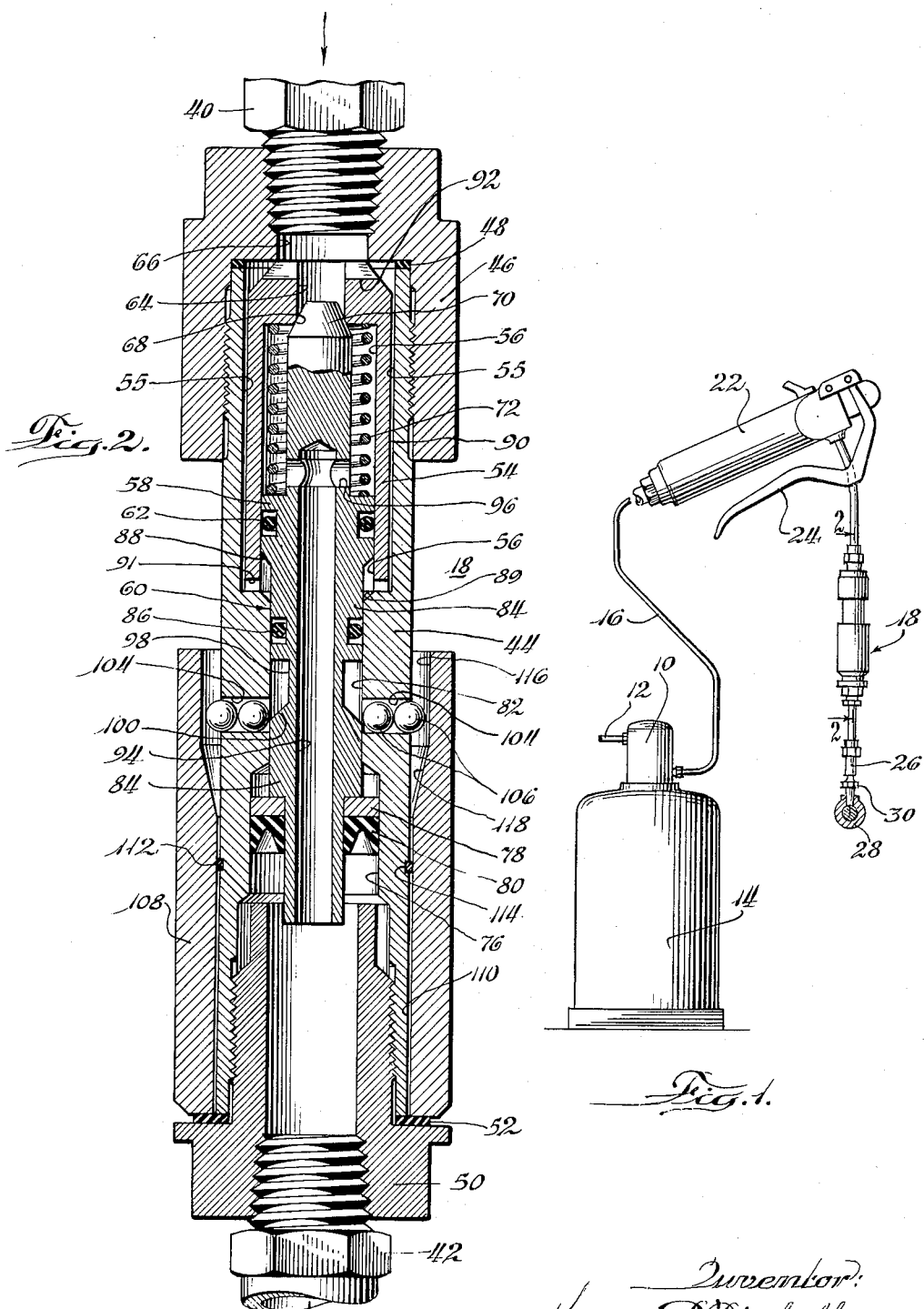

2,731,034

LUBRICANT PRESSURE REGULATING VALVE

Henry T. Dinkelkamp, Chicago, Ill., assignor to Stewart-Warner Corporation, Chicago, Ill., a corporation of Virginia Application August 10, 1950, Serial No. 178,713

5 Claims. (Cl. 137—495)

This invention relates to apparatus for supplying lubricant from a high pressure source at a reduced pressure.

In order to force lubricant into fitting, clogged or "frozen" machine bearings, it is often necessary to provide apparatus capable of supplying lubricant under extremely high pressures, in the order of 3,000 to 8,000 pounds per square inch (p. s. i.).

However, such extremely high pressures cause severe damage to certain other types of bearings. For example, lubricant under such high pressures will burst or expel the lubricant sealing members of sealed ball and roller bearings. In other situations the use of such high pressures causes excessive leakage of lubricant from the bearings and creates an unsightly and wasteful condition.

Because of these considerations, it is desirable to provide pressure lubricating apparatus which is selectively capable of supplying lubricant either at extremely high pressure or at a moderate pressure, such as 400 p. s. i. One way of accomplishing this has been to insert a pressure reducing valve at the outlet of the usual control valve which has its inlet connected with a high pressure lubricant pump. Such pressure reducing valves have been provided with devices for rendering the valve ineffective to reduce the lubricant pressure when lubricant under the full pump pressure is desired.

The pressure reducing valves of the prior art have had a number of drawbacks. The pressure developed by the usual lubricant pump is subject to wide fluctuations for a number of reasons. For example, lubricant pumps are commonly operated by air under pressure, and usually the air pressure is subject to fairly wide fluctuations which cause corresponding changes in the lubricant pressure. Variations in the demand for lubricant and in the temperature of the lubricant are other important factors which cause fluctuations of lubricant pressure.

The pressure reducing valves of the prior art have characteristically been ratio devices which provide an outlet pressure which is a predetermined fraction of the inlet lubricant pressure. Therefore, the outlet pressure has been subject to variations corresponding with the usual fluctuations in the pressure developed by a lubricant pump. Consequently the pressure reducing valves of the prior art have had the disadvantages of sometimes supplying lubricant at a pressure too low for satisfactory lubrication and, at other times, at pressures too high for lubricating sealed ball bearings.

Another drawback of the prior art pressure reducing valves is their inability satisfactorily to provide a sufficiently great reduction in lubricant pressure. The necessity for reducing the pressure from a value as high as 8,000 p. s. i. to 400 p. s. i. has led to the provision of heavy and bulky pressure reducing valves in the prior art.

The general object of this invention is to provide an improved pressure regulating valve for supplying lubricant under a moderate pressure from an extremely high pressure source.

A further object is to provide a pressure regulating valve having substantially constant outlet lubricant pressure throughout a wide range of inlet pressure variations.

A further object is to provide a lubricant pressure reducing valve capable of maintaining an outlet pressure below a predetermined limit even if the inlet pressure occasionally becomes abnormally great.

A still further object is to provide a compact, low cost pressure regulating valve capable of producing an extremely great reduction in lubricant pressure.

Further objects, advantages and principles of this invention will become apparent from the following description taken in connection with the drawing, in which:

Fig. 1 is a diagrammatic view illustrating an application of the pressure regulating valve of the invention; and Fig. 2 is an enlarged sectional view of the pressure regulating valve taken on the line 2—2 of Fig. 1.

In Fig. 1 a lubricant pump 10 obtains operating power from an air pressure line 12 which may be connected with an air compressor, not shown. The pump 10 withdraws lubricant from a reservoir 14 and forces the lubricant outwardly through a lubricant hose 16 at an extremely high pressure which may range between 3,000 and 8,000 p. s. i., for example.

The high pressure lubricant hose is connected with a pressure regulating valve 18, constructed according to this invention, by a control valve mechanism 22 of the usual type. The control valve 22 has a trigger or control lever 24 operable to permit transmission of lubricant through the pressure regulating valve 18 and an outlet coupler 26 to a bearing 28 having a nipple shaped lubricant fitting 30 adapted to secure the coupler 26.

When the control lever 24 of the control valve 22 is operated, a shot of lubricant is forced from the pump 10 through the control valve 22 and the regulating valve 18 into the bearing 28.

For convenience and clarity of illustration the lubricant pump 10 and the reservoir 14 of Fig. 1 are shown on a somewhat smaller scale than the regulating valve 18 and the control valve 22.

As shown in Fig. 2, the pressure regulating valve 18 has an inlet fitting 40 adapted to be connected with a conduit such as the outlet of the control valve 22, supplying lubricant under an extremely high pressure, and an outlet fitting 42 adapted to be connected with an outlet device such as the coupler 26.

The pressure regulating valve has a chambered, generally tubular body 44. A collar 46 is threaded over the outside of the inlet end of the body 44 and is internally threaded at its outer end to receive the inlet fitting 40. A gasket 48 forms a lubricant-tight seal between the collar 46 and the body 44.

A bushing 50 is threaded in the outlet end of the body 44 and is internally threaded at its outer end to receive the outlet fitting 42. A gasket 52, positioned between the body 44 and the bushing 50, provides a lubricant retaining seal.

A bushing 54 is positioned within a bore 55 in the inlet end of the body 44 and is loosely retained therein by the collar 46. The interior chamber of the bushing 54 forms a cylinder 56 for an inlet piston 58 forming a part of an elongated generally tubular member 60 which is reciprocable within the body 44. The inlet piston 58 has a packing ring 62 to minimize leakage of lubricant around the piston.

The inlet end of the cylinder 56 communicates with the inlet fitting 40 through a cylindrical bore 64 in the bushing 54 and a cylindrical passageway 66 through the collar 46.

The outlet end of the bore 64 is chamfered to form a valve seat 68 for lubricant tight engagement with a conical lubricant stop valve or plug 70 formed integrally with the slidable member 60 and positioned to extend from the inlet piston 58 toward the inlet valve seat 68.

A helical spring 72 is compressed between the inlet end of the cylinder 56 and the inlet piston 58, normally to bias the slidable member 60 toward the outlet fitting 42.

The outlet end of the body 44 is provided with a chamber forming a cylinder 76 for an outlet piston 78 having a lubricant sealing packing ring 80. The piston 78 is suitably secured to the outlet end of the slidable member 60.

The portion of the body 44 intermediate the bushing 54 and the cylinder 76 is provided with a cylindrical bore 82 for slidably guiding a stem 84 connecting the inlet piston 58 with the outlet piston 78. The stem 84 is grooved to receive a packing ring 86 for preventing leakage of lubricant between the stem and the bore 82.

The inlet piston 58 has an annular generally conical end surface 88 which faces away from the inlet valve seat 68. The end surface 88 connects the outer cylindrical surface of the piston 58 with the outer cylindrical surface of the piston stem 84.

A generally conical surface 89 connects the inner cylindrical surface of the inlet piston cylinder 56 with the inner cylindrical surface of the bore 82 and forms a piston cylinder end surface which is remote from the valve seat 68.

The internal bore 55 has a greater diameter than the bushing 54 to form a longitudinal annular passage 90 extending from the inlet bore 66 of the collar 46 toward the outlet end of the regulating valve.

Several radial notches or openings 91 in the lower end of the bushing 54 connect with the longitudinal annular passage 90 and enter the piston cylinder 56 adjacent the conical end surface 89. The annular passage 90 is connected with the inlet bore 66 by a pair of notches 92 in the upper end of the bushing 54.

The slidable member 60 has an internal cylindrical bore 94 extending from the outlet end of the member 60 and terminating beyond the inlet end of the inlet piston 58. A transverse bore 96 through the member 60 on the inlet side of the piston 58 connects the longitudinal bore 94 with the portion of the cylinder 56 on the inlet side of the piston 58.

The stem 84, which is the portion of the slidable member 60 connecting the inlet piston 58 with the outlet piston 78, has a slender intermediate cylindrical neck portion 98. A conical surface 100 connects the outlet end of the cylindrical outer surface of the neck 98 with the cylindrical outer surface of the stem 84.

The body 44 has a plurality of transverse holes 104 connecting the bore 82 with the atmosphere and positioned adjacent the outlet end of the neck 98 when the slidable member 60 is moved toward one of its extreme positions in which the inlet valve 70 engages the inlet valve seat 68. Two balls 106 are positioned in each of the holes 104, and the balls are retained by a slidable sleeve 108 positioned around the outer cylindrical surface 110 of the outlet end of the body 44. At its outlet end the sleeve 108 has a relatively close sliding fit with the outer surface 110 of the body 44. A split spring ring 112 is positioned between the sleeve 108 and the body 44 in an annular groove 114 in the cylindrical surface 110 frictionally to hold the sleeve 108 in any position to which it may be adjusted.

The inlet end of the sleeve 108 has an enlarged bore 116 to permit the sleeve 108 to pass over the protruding balls 106. The bore 116 is connected with the inner cylindrical surface of the outlet end of the slidable member 108 by a conical camming surface 118.

When the pressure regulating valve 18 is not subject to lubricant pressure, the helical spring 72 normally biases the slidable member 60 toward the outlet end of the regulating valve so that the conical end surface 88 of the inlet piston 58 engages the annular conical end surface 89 of the cylinder 56. Thus the inlet valve 70 normally does not engage the inlet valve seat 68.

Lubricant, supplied under pressure to the inlet fitting 40, flows freely through the bores 66 and 64, through the valve seat 68, around the valve 70, and through the inlet portion of the cylinder 56, the transverse bore 96 and the longitudinal bore 94 to the outlet bushing 50 and the outlet fitting 42.

If the outward flow of lubricant from the pressure regulating valve 18 is restricted or stopped, lubricant pressure rapidly builds up in the outlet piston cylinder 76. The consequent force upon the outlet piston 78 moves the slidable member 60 against the compressional resistance of the spring 72 until the inlet valve 70 engages the inlet valve seat 68 as shown, to prevent further flow of lubricant around the valve into the cylinder 56 until the outlet pressure drops.

When the inlet valve plug 70 engages its seat 68, the portion of the face of the valve plug extending beyond the seat into the bore 64 is subjected to the inlet lubricant pressure. Lubricant in the bore 64 directly exerts a resultant force upon the face of the valve plug, tending to unseat the valve plug, and equal to the mathematical product of the inlet lubricant pressure multiplied by the effective area of the valve plug. The effective area of the valve plug 70 is the cross sectional area of the plug where it engages the valve seat 68, and is equal to the cross-sectional area of the seat.

However, lubricant at the inlet pressure is admitted through the passage 90 to the portion of the inlet piston cylinder 56 between the piston end surface 88 and the cylinder end surface 89, for subjecting the piston end surface 88 to the inlet lubricant pressure. The resultant force, directly exerted upon the surface 88 by lubricant in the cylinder 56 and tending to seat or close the valve plug 70, is equal to the mathematical product of the inlet pressure multiplied by the effective area of the annular surface 88. The effective area of the surface 88 is the area of a projection of the surface 88 upon a plane perpendicular to the direction along which the piston 58 is movable. The effective area of the surface 88 is equal to the arithmetical difference between the cross-sectional area of the piston cylinder 56 and the cross-sectional area of the stem-guiding bore 82.

The force produced by lubricant acting directly on the piston end surface 88 tends to counterbalance or neutralize the valve opening force produced by lubricant in the bore 64 acting directly upon the face of the valve 70.

The pressure regulating valve preferably is constructed so that the effective area of the annular piston end surface 88, as defined above, is at least as great as the effective area of the valve plug 70, as defined above. Consequently, the force upon the slidable member 60, due solely to the lubricant at the inlet pressure acting directly upon the face of the valve 70, is completely balanced by the force of lubricant at the inlet pressure acting directly upon the annular surface 88.

Because of this balancing or equilibrium of forces, lubricant pressure acting upon the face of the valve 70 is ineffective to open the valve, even if the inlet lubricant pressure rises to abnormally high values. Consequently, variations in the inlet lubricant pressure have very little effect upon the value of the outlet pressure maintained by the regulating valve, and the outlet pressure does not exceed a predetermined value even if the inlet pressure is abnormally great.

The pressure regulating valve preferably is constructed so that the effective area of the annular piston end surface 88 is somewhat greater than the effective area of the valve plug 70 so that the inlet lubricant pressure acting directly on the annular piston surface 88 tends to overcome frictional forces which resist closure of the valve 70, as well as counteracting lubricant pressure forces exerted directly on the face of the valve 70.

By providing a construction in which lubricant at the inlet pressure acting upon the reversely facing annular surface 88 completely neutralizes the force of lubricant at the inlet pressure acting directly upon the face of the valve plug 70, the outlet lubricant pressure maintained by the valve is substantially constant regardless of variations of the inlet lubricant pressure. In the pressure regulating valve of this invention the only unbalanced force tending to open the valve 70 is produced by the compression spring 72. The spring 72 is constructed so that the force provided by the desired outlet lubricant pressure will compress the spring just enough to close the valve plug 70.

The action of the lubricant pressure regulating valve of this invention may be represented by a set of equations. The effective area A of the valve plug 70, the cross-sectional area B of the inlet piston cylinder 56, and the cross-sectional area C of the bore 82 are related according to the following equation:

$$A = B - C - f$$

The factor $f$, introduced into the above equation, represents the allowance for the frictional forces which resist closing of the valve 70. Of course, the quantity $B-C$ is equal to the effective area of the annular piston end surface 88.

I have found that my pressure regulating valve may be constructed for producing a reduction of pressure from approximately 3,000 p. s. i. to 400 p. s. i. if the area A is .015 sq. in., the area B is .11 sq. in., the area C is .093 sq. in., and the allowance for friction $f$ is .002 sq. in., for example.

The force S necessary to compress the spring 72 for valve closure is related to the cross sectional area D of the outlet piston cylinder 76, the cross sectional area B of the inlet piston cylinder 56, the effective area A of the valve plug 70, and the desired maximum outlet pressure P, according to the following equation:

$$S = (D - (B - A))P$$

I have found that a 40 lb. spring will produce a regulated outlet pressure of approximately 400 p. s. i. if the area D is .195 sq. in., the area B is .11 sq. in., and the area A is .015 sq. in., for example.

Using the above defined notation, the maximum outlet pressure P is found by the following equation:

$$P = \frac{S}{D - (B - A)}$$

This equation emphasizes that the maximum outlet pressure is substantially independent of the inlet pressure, within the operating range.

Thus, the operating outlet pressure is determined for the most part by the relationship between the effective net area of the slidable member 60 facing in the direction of the outlet 42 and the strength of the spring 72. The maximum outlet pressure is approximately equal to the ratio of the force exerted by the spring 72 when it is fully compressed to the effective area of the slidable member 60.

Since the force of the lubricant at the inlet pressure upon the face of the valve 70 is counterbalanced by the force of the lubricant upon the oppositely facing surface 88 of the inlet piston 58, the maximum outlet pressure is substantially unaffected by large variations in the inlet pressure. Thus the pressure regulating valve of this invention provides lubricant at a substantially constant reduced pressure. Damage to sealed bearings from excessive lubricant pressure is thereby avoided.

When it is desired to furnish the full inlet lubricant pressure to the outlet 42, the slidable sleeve 108 is moved toward the inlet end of the regulator until the sleeve engages the collar 46. The conical camming surface 118 of the sleeve 108 forces the balls 106 inwardly against the conical shoulder 100 at the outlet end of the slender neck portion 98 of the slidable member 60. The forces exerted by the balls 106 upon the shoulder 100 moves the slidable member 60 toward the outlet end of the regulator 18 to unseat the inlet valve 70. The balls 106 are then forced by the sleeve 108 into the groove in the stem 84 formed by the slender neck 98, to retain the valve 70 in unseated position. When the valve 70 is locked in open position by the balls 106, the regulating valve is ineffective, and lubricant is free to pass through the valve to the outlet 42 at the full inlet pressure.

Because the slidable member 60 is approximately in equilibrium with respect to the inlet pressure of the lubricant, the outlet pressure, acting upon the outlet piston 78, 80, closes the inlet valve 70 without substantial resistance due to the inlet pressure. Thus the minimum permissible size of the outlet piston 78, for obtaining a given amount of pressure reduction, is not limited by the inlet pressure. Large values of pressure reduction may be obtained with the regulating valve of this invention without providing an objectionably large outlet piston. Thus the pressure regulating valve may be light in weight and compact and nevertheless able to produce large reductions of lubricant pressure.

While I have shown and described a preferred embodiment of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. A lubricant pressure regulator having an inlet and an outlet, including in combination, cylinder forming means between the inlet and the outlet and having therein an inlet cylinder, a stem cylinder communicating with the inlet cylinder, and an outlet cylinder communicating with the outlet, an assembly including an inlet piston movable in the inlet cylinder, an outlet piston movable in the outlet cylinder, and a stem interconnecting the pistons and slidable in the stem cylinder, a valve controlling the flow of lubricant from the inlet to the inlet cylinder and having a valve member connected to the inlet piston and exposed to the force of lubricant pressure at the inlet to tend to move it to valve opening position, a conduit bypassing the valve and connecting the inlet with the inlet cylinder so that lubricant pressure at the inlet is applied to the inlet piston to tend to move the valve member to valve closing position, the relative effective areas of the valve member and the inlet piston being such that the forces acting thereon are substantially in equilibrium, a second conduit connecting the inlet cylinder at the outlet of the valve with the outlet cylinder, means biasing the assembly in such direction as to move the valve member to open position, cam-actuated latching means carried by said cylinder forming means and engageable with the stem of said assembly and adapted to hold the assembly in such position as to maintain the valve member in open position, and manually operable camming means for actuating said latching means, whereby the regulator may be used to regulate the pressure of lubricant at the outlet irrespective of lubricant pressure at the inlet when the latching means is in inoperative position and the regulator may be used to communicate lubricant at inlet pressure to the outlet when the latching means is in operative position.

2. A lubricant pressure regulator comprising in combination a body, an inlet to the body and an outlet therefrom, a bore formed in the body and communicating with the inlet, a bushing mounted in the bore so as to leave a space therebetween, an inlet cylinder formed in the bushing, an inlet piston reciprocable in the inlet cylinder, a conduit in the bushing connecting the inlet cylinder with the inlet, a valve member connected to the inlet piston and adapted to control the flow of lubricant through the conduit, lubricant pressure in the conduit tending to move the valve member to open position, the space around the bushing and means formed in said bushing forming a passageway bypassing the inlet conduit and connecting the inlet with the inlet cylinder and adapted to apply lubricant under pressure to the inlet piston, the effective areas of the valve member and the inlet piston being such that the lubricant pressure forces acting thereon tend to be in equilibrium, an outlet cylinder communicating with the outlet, an outlet piston movable in the outlet cylinder and adapted to be responsive to pressures existing in the outlet and outlet cylinder, means interconnecting the inlet and outlet pistons for movement in unison, a passageway through said means and the inlet and outlet pistons to communicate the interior of the inlet cylinder with the outlet cylinder to permit flow of lubricant therethrough, and means biasing the assembly of the pistons, the connecting means and the valve member to valve opening position, whereby an excessive amount of pressure existing in the outlet and outlet cylinder acts upon the outlet piston to move the assembly to valve closing position irrespective of the force exerted by the lubricant under pressure at the inlet.

3. A lubricant pressure regulator having an inlet and an outlet, including in combination, cylinder forming means between the inlet and the outlet and having therein an inlet cylinder, a stem cylinder communicating with the inlet cylinder, and an outlet cylinder communicating with the outlet, an assembly including an inlet piston movable in the inlet cylinder, an outlet piston movable in the outlet cylinder, and a stem interconnecting the pistons and slidable in the stem cylinder, a valve controlling the flow of lubricant from the inlet to the inlet cylinder and having a valve member connected to the inlet piston and exposed to the force of lubricant pressure at the inlet to tend to move it to valve opening position, a conduit bypassing the valve and connecting the inlet with the inlet cylinder so that lubricant pressure at the inlet is supplied to the inlet piston to tend to move the valve member to valve closing position, the relative effective areas of the valve member and the inlet piston being such that the forces acting thereon are substantially in equilibrium, a second conduit connecting the inlet cylinder at the outlet of the valve with the outlet cylinder, means biasing the assembly in such direction as to move the valve member to open position, the stem having a circumferential groove having one edge thereof formed with a camming surface, the cylinder forming means having openings therein communicating with the stem groove at the camming surface thereof, latching members carried in the openings to project outwardly therefrom, and a manually operable camming means engageable with the latching members to move them against the camming surface and into the stem groove to hold the valve member in valve opening position, whereby the regulator may be used to regulate the pressure of lubricant at the outlet irrespective of lubricant pressure at the inlet when the camming means is in inoperative position and the regulator may be used to communicate lubricant at inlet pressure to the outlet when the camming means is in operative position.

4. A lubricant pressure regulator comprising in combination means forming a body, an inlet to the body and an outlet therefrom, a bore formed in the body and communicating with the inlet, a bushing mounted in the bore so as to leave a space therebetween, an inlet cylinder formed in the bushing, an inlet piston reciprocable in the inlet cylinder, a conduit in the bushing connecting the inlet cylinder with the inlet, a valve member connected to the inlet piston and adapted to control the flow of lubricant through the conduit, lubricant pressure in the conduit tending to move the valve member to open position, the space around the bushing and means formed in said bushing forming a passageway bypassing the inlet conduit and connecting the inlet with the inlet cylinder and adapted to apply lubricant under pressure to the inlet piston, the effective areas of the valve member and the inlet piston being such that the lubricant pressure forces acting thereon tend to be in equilibrium, an outlet cylinder communicating with the outlet, an outlet piston movable in the outlet cylinder and adapted to be responsive to pressure existing in the outlet cylinder, a bore in said body interconnecting the inlet and outlet cylinders, a stem slidable in the bore and interconnecting the inlet and outlet pistons for movement in unison, a passageway through the stem and the inlet and outlet pistons to communicate the interior of the inlet cylinder with the outlet cylinder to permit flow of lubricant therethrough, means biasing the assembly of the pistons, the stem and the valve member to valve opening position, cam-actuated latching means carried by the body and engageable with the stem and adapted to hold the assembly in such position as to maintain the valve member in valve opening position, and manually operated camming means mounted on the body for actuating the latching means, whereby the regulator may be used to regulate the pressure of lubricant at the outlet irrespective of lubricant pressure at the inlet when the camming means is in inoperative position and the regulator may be used to communicate lubricant at inlet pressure to the outlet when the camming means is in operative position.

5. A lubricant pressure regulator comprising in combination means forming a generally tubular body, an inlet to the body and an outlet therefrom, a bore formed in the body and communicating with the inlet, a bushing mounted in the bore so as to leave an annular space therearound, an inlet cylinder formed in the bushing, an inlet piston reciprocable in the inlet cylinder, a conduit in the bushing connecting the inlet cylinder with the inlet, a valve member connected to the inlet piston and adapted to control the flow of lubricant through the conduit, lubricant pressure in the conduit tending to move the valve member to open position, the annular space around the bushing and openings formed in said bushing forming a passageway bypassing the inlet conduit and connecting the inlet with the inlet cylinder and adapted to apply lubricant under pressure to the inlet piston, the effective areas of the valve member and the inlet piston being such that the lubricant pressure forces acting thereon tend to be in equilibrium, an outlet cylinder communicating with the outlet, an outlet piston movable in the outlet cylinder and adapted to be responsive to pressures existing in the outlet and outlet cylinder, a base in said body interconnecting the inlet and outlet cylinders, a stem slidable in the base and interconnecting the inlet and outlet pistons for movement in unison, a passageway through the stem and the inlet and outlet pistons to communicate the interior of the inlet cylinder with the outlet cylinder to permit flow of lubricant therethrough, means biasing the assembly of the pistons, the stem and the valve member to valve opening position, the stem having a circumferential groove having one edge thereof formed with a camming surface, the body having openings therein communicating with the stem groove at the camming surface thereof, latching members carried in the openings to project outwardly therefrom, and a manually operable camming sleeve slidable on the body and engageable with the latching members to move them against the camming surface and into the stem groove to move the valve member into and hold it in open position, whereby the regulator may be used to regulate the pressure of lubricant at the outlet irrespective of lubricant pressure at the inlet when the camming sleeve is in inoperative position and the regulator may be used to communicate lubricant at inlet pressure to the outlet when the camming sleeve is in operative position.

References Cited in the file of this patent

UNITED STATES PATENTS 47,184    Bishop _____ Apr. 11, 1865

(Other references on following page)

UNITED STATES PATENTS

| | | |
|---|---|---|
| 207,646 | Dauchamp | Sept. 3, 1878 |
| 662,013 | Mueller | Nov. 20, 1900 |
| 735,144 | Porter | Aug. 4, 1903 |
| 768,246 | Taylor | Aug. 23, 1904 |
| 1,131,341 | Dieter | Mar. 9, 1915 |
| 1,365,476 | Fuller | Jan. 11, 1921 |
| 1,406,012 | Hinchman | Feb. 7, 1922 |
| 1,432,745 | Dieter | Oct. 24, 1922 |
| 2,463,253 | Earle | Mar. 1, 1949 |